United States Patent [19]
Gibney et al.

[11] Patent Number: 5,655,713
[45] Date of Patent: Aug. 12, 1997

[54] AUTOMATED VEHICLE WASHING SYSTEMS USING CONCENTRATED DETERGENTS

[75] Inventors: Thomas J. Gibney, Naperville, Ill.; Thomas J. Bagnara, Crown Point, Ind.

[73] Assignee: Turtle Wax, Inc., Chicago, Ill.

[21] Appl. No.: 296,775

[22] Filed: Aug. 26, 1994

[51] Int. Cl.$^6$ .................................................. B05B 7/30
[52] U.S. Cl. .................. 239/310; 134/99.2; 134/100.1; 134/123; 239/340
[58] Field of Search ..................... 239/310, 318, 239/340, 352, 750–753; 134/99.2, 100.1, 123; 251/903, 332

[56] References Cited

U.S. PATENT DOCUMENTS

| | | | |
|---|---|---|---|
| 2,606,068 | 8/1952 | Bonacor | 239/310 |
| 2,788,009 | 4/1957 | Lones . | |
| 2,827,913 | 3/1958 | Wagner | 251/332 X |
| 3,011,501 | 12/1961 | Beranek . | |
| 3,400,725 | 9/1968 | Miller et al. . | |
| 3,433,417 | 3/1969 | Poppitz | 239/318 |
| 3,447,505 | 6/1969 | Wagner | 239/318 |
| 3,464,631 | 9/1969 | Lieffring et al. . | |
| 3,801,017 | 4/1974 | Jarzynski | 239/318 |
| 4,382,552 | 5/1983 | Lubsen et al. | 239/318 |
| 4,383,935 | 5/1983 | Hull . | |
| 4,715,391 | 12/1987 | Scheller . | |
| 4,848,384 | 7/1989 | Christopher et al. . | |
| 5,098,023 | 3/1992 | Burke | 239/273 |

*Primary Examiner*—Andres Kashnikow
*Attorney, Agent, or Firm*—Baker & McKenzie

[57] ABSTRACT

Retrofit systems are provided to convert existing automated vehicle washing systems from using conventional car wash chemicals to highly concentrated chemicals. The retrofit systems enable the concentrated chemicals to be pre-diluted before they are mixed with water from the main water supply. The two systems provided enable the operators of existing car washes to convert from conventional chemicals to highly concentrated chemicals without purchasing an excessive amount of new equipment or carrying out extensive modifications of existing equipment. A novel feature of one embodiment of the present invention includes the use of pre-dilution block for mixing highly concentrated chemical with pre-dilution water prior to the introduction of the mixture to the spray arch where it is diluted again with water from the main water supply. A second embodiment includes the pre-dilution of concentrated chemical twice before it is introduced to the spray arch where it is again diluted with water from the main water supply.

16 Claims, 5 Drawing Sheets

Fig. 3

PRIOR ART

AUTOMATED VEHICLE WASHING SYSTEMS USING CONCENTRATED DETERGENTS

FIELD OF THE INVENTION

This invention relates generally to automated systems for washing and waxing vehicles. The invention comprises a modification or a retrofit to existing automated vehicle washing systems to enable operators of existing systems to switch over to new, highly concentrated cleaning and waxing chemicals while still employing the same basic equipment used for conventional, less concentrated chemicals.

BACKGROUND OF THE INVENTION

Chemicals used in automatic car washes are now available in highly concentrated formulas. However, the existing car wash equipment is designed to accommodate the conventional, less concentrated chemicals. The present invention addresses the problem of converting automatic car washing equipment from conventional car cleaning and waxing chemicals to highly concentrated car cleaning and waxing chemicals without substantially replacing existing equipment or making expensive and time consuming modifications to existing equipment.

Existing car wash systems now use conventional chemicals supplied in 55-gallon drums. The broad term "chemical" refers to detergents and other cleaning agents as well as to waxes, sealants and other conditioners. The chemicals are typically drawn out of the 55-gallon drum with a pump, commonly referred to as a "feed pump" or a "direct feed pump", and then injected into a water line through a injection valve or check valve. The chemicals are then injected into the overhead "spray arch" of the car wash where they are mixed with water just before the chemical/water mixture is being sprayed onto the vehicles. The dilution of the chemicals in the spray arch only is insufficient for highly concentrated chemicals now available and would result in substantial waste of the concentrated chemicals and rinsing problems. Therefore, some modification of the existing systems is required before they can employ the more concentrated chemicals.

Another method of drawing the chemicals out of the 55-gallon drum is to use an automated liquid level control proportioner commonly sold under the HYDROMINDER™ mark by Hydro Systems Company of Cincinnati, Ohio. Water from the main water supply flows through the HYDROMINDER™ valve and the venturi effect of the water flowing through the body of the proportioner draws the chemicals from the 55-gallon drum into the output stream. The output stream, which is a partially diluted solution of chemicals, is deposited into a stock solution tank before it is pumped into the "spray arch" where the solution is mixed again with water and applied to the vehicles. Thus, use of the HYDROMINDER™ systems results in dilution of the chemicals twice. First, the chemicals drawn through the HYDROMINDER™ body are mixed with water to make up the stock solution tank; second, the chemicals are diluted again when the stock solution is mixed with water in the spray arch. Even though the present use of the HYDROMINDER™ systems dilutes the chemicals twice before they are applied to the vehicles, the HYDROMINDER™ systems as currently used will still not provide sufficient dilution for the highly concentrated chemicals now available. Modification of car wash systems employing the HYDROMINDER™ valves is still required.

As noted above, the problem addressed by the present invention is how to retrofit or convert existing car wash facilities from using conventional detergents (supplied in 55-gallon drums) to highly concentrated detergents and waxes that may be in excess of ten times stronger or more concentrated than conventional chemicals. In essence, neither the conventional "direct feed pump" or HYDROMINDER™ systems discussed above are capable of properly diluting the concentrated chemicals that are now available. Further, car wash operators will be very reluctant to convert from conventional detergents to highly concentrated detergents if an excessive amount of new equipment or modification of existing equipment is required.

The proposed conversion from conventional chemicals provided in 55-gallon drums to highly concentrated chemicals provided in 5-gallon containers provides many ancillary benefits for car wash operations. First, the car wash operator will no longer be responsible for disposing of the 55-gallon drums which normally cannot be deposited in a normal trash bin. While 55-gallon drums are reusable, they are not recyclable.

Further, from the chemical manufacturer's point of view, to be able to supply concentrated chemicals in a 5-gallon container, which may include a plastic bag of chemicals enclosed in a protective cardboard box, is highly desirable. First, sales personnel or account representatives can carry the boxes of chemicals in the trunk of a sedan; a truck or van for delivering the chemicals to car wash operators is not required. Second, the account representatives can move, replace and install the smaller boxes of highly concentrated chemicals without assistance. In contrast, 55-gallon drums can weigh as much as 500 pounds which requires two or more people to move a 55-gallon drum full of chemicals. Workplace injuries as a result during the moving of heavy objects like a full 55-gallon drum can be avoided. Further, no special arrangements for the disposal of empty concentrate boxes or bags need to be made. The plastic bags held with the boxes can be recycled, as well as the cardboard box.

Thus, while the conversion from conventional car wash chemicals to highly concentrated chemicals provides benefits to both the chemical manufacturer and car wash operators, car wash operators will be reluctant to convert to the highly concentrated chemicals if a substantial amount of new equipment or modification to existing equipment is required in order to convert from the regular strength chemicals to the chemicals. The present invention specifically addresses this problem and provides a means for converting existing car wash operations from conventional chemicals to concentrated chemicals without an excessive amount of new equipment or modification to existing equipment.

SUMMARY OF THE INVENTION

The present invention satisfies the aforenoted needs of car wash operators by providing an inexpensive mechanism for pre-dilutions of highly concentrated car wash chemicals so the concentrated chemicals can be used with the equipment in place at existing car wash facilities.

Specifically, the present invention provides a means for pre-diluting the concentrated chemicals with water before they are mixed with the main water supply in the overhead spray arch of the car wash which sprays the fully diluted concentrates onto the vehicle. In short, the concentrated chemicals are diluted two to three times before they are applied to the vehicle. The modification to the existing car wash equipment is minimal and the new equipment is add-on equipment which relates to the pre-dilution steps only. The modifications required by the present application do not effect the pump systems which pump the concentrate to the spray arch or any of the valves or fittings relating to the spray arch.

One embodiment of the present invention includes two reservoirs: a concentrated detergent reservoir in the form of a 15-gallon secondary container and a pre-dilution water reservoir that works in a manner similar to a water tank for a toilet. A 15-gallon secondary container is filled with concentrated chemicals that are provided in smaller containers, preferably a 5-gallon plastic bag contained within a cardboard box. If the water level in the pre-dilution reservoir drops, a float valve opens the connection between the pre-dilution reservoir and the main water supply to refill the tank.

Both the concentrate reservoir and the pre-dilution reservoir are connected to separate input passages of a pre-dilution block. Inside the pre-dilution block, the passageway for the concentrate and the passageway for the pre-dilution water are connected to form a common output passageway. Thus, the pre-dilution block provides a mixing chamber for the concentrate and the pre-dilution water in the form of a common output passageway. In the preferred embodiment, the pre-dilution block also includes a means for controlling the input flow of either pre-dilution water or concentrate. The means for controlling the input flow is preferably a stem valve that controls the input rate of pre-dilution water, thereby leaving the input flow rate of concentrate constant. It will also be noted that, by controlling flow through one channel (i.e., the pre-dilution water), one also controls the flow through the second channel (i.e., the concentrate). Further, depending upon the chemicals used, the stem valve can be used to directly control the input flow rate of the concentrate as opposed to the pre-dilution water.

The mixture of concentrate and pre-dilution water leaves the pre-dilution block through the common output passageway and enters a feed pump where it is pumped to the spray arch (or dispensing arch) through an injection valve or check valve. At the injection valve and inside the arch, the mixture of concentrate and pre-dilution water is further mixed with the main water supply before the mixture of concentrate, pre-dilution water and additional water from the main water supply is sprayed onto the vehicle.

By employing the pre-dilution block or pre-dilution concept, the concentrated detergent can be diluted to ratios in excess of 300 parts water to 1 part detergent. In fact, a dilution ratio of 2,500 parts water to 1 part detergent has been implemented using the above-described embodiment of the present invention. In contrast, without the pre-dilution technique, conventional car wash equipment is capable of dilution ratios ranging from 4 to a maximum of 300 parts water to 1 part detergent.

A second embodiment of the present invention does not employ a pre-dilution block as described above but utilizes an existing proportioning and dispensing system already in place at the car wash facility in combination with a pre-dilution double-tip assembly. If the facility is equipped with an automatic liquid level control proportioner, like those sold under the HYDROMINDER™ trademark, the concentrate reservoir and pre-dilution reservoir must be provided and are connected to a pre-dilution double-tip assembly which is screwed into the HYDROMINDER™ body. The double-tip assembly includes two input passages—one for the concentrate and one for the pre-dilution water. The output of the double-tip assembly is connected to the HYDROMINDER™ body. Water from the main water supply flows through the HYDROMINDER™ body. The venturi effect of the water flowing through the HYDROMINDER™ body draws a mixture of pre-dilution water and concentrate out of the double-tip assembly and into the output stream of the HYDROMINDER™ system. The actual flow rates of the concentrate and the pre-dilution water through the double-tip assembly are controlled by metering tips that disposed within the input passages for the concentrate and pre-dilution water respectively. The size of each metering tip will depend upon the specific chemical being used and peculiarities of the car wash system.

The output stream from the HYDROMINDER™ system is deposited into a stock solution tank. When the stock solution tank reaches a desired level, at float-valve mechanism, connected to the HYDROMINDER™ system, shuts off input to the HYDROMINDER™ system which, in turn, stops drawing concentrate and pre-dilution water from their respective reservoirs. Stock solution is pumped from the stock solution tank to the spray arch where it is again diluted with water from the main water supply.

Thus, the modified HYDROMINDER™ system dilutes the chemicals three times: (1) in the double-tip assembly with pre-dilution water; (2) in the HYDROMINDER™ body with water flowing through the HYDROMINDER™ system; and (3) again, in the spray arch with water from the main water supply.

The present invention also lends itself to improved methods for retrofitting existing car washes. Specifically, with reference to the first embodiment, an account representative can easily supply the car wash operator with a concentrate reservoir in the form of a secondary container which is preferably large enough (15 gallons) to hold from two to three 5-gallon bag-in-a-box containers of concentrate.

The account representative can also easily supply the operator with a pre-dilution water reservoir which works like the water tank of a common toilet but can also take the form of a 15-gallon plastic bucket. The concentrate and pre-dilution water reservoirs are connected to the respective input passages of a pre-dilution block, which again, is supplied by the account representative. The output of the pre-dilution block is then connected to a feed pump which would already be in place because it would be previously used to draw chemicals out of the 55-gallon drum. The feed pump is already connected to an injection valve that is mounted at the spray arch. The spray arch is connected to the main water supply which mixes with the concentrate/pre-dilution water solution to create still a further diluted output for application to the vehicles.

Thus, the only equipment that the car wash operator or the account representative must supply is the pre-dilution block, the pre-dilution water reservoir and the concentrate reservoir which can be simply be a 15 gallon bucket. Of course, the concentrates would also be supplied by the account representative in the form of a 5 gallon package or 5 gallon bag-in-a-box which is substantially easier for the account representative to supply than conventional chemicals which are normally provided in a 55-gallon drum.

Referring to the second embodiment, again, the account representative provides the concentrate reservoir, the pre-dilution reservoir and the double-tip metering assembly. The account representative then connects the concentrate reservoir and pre-dilution reservoir to the double-tip metering assembly and connects the output of the double-tip metering assembly to the HYDROMINDER® dispensing system which is already in place. The output of the HYDROMINDER® dispensing system flows into the stock solution tank which is already in place. As discussed above, the HYDROMINDER® dispensing system combines the premix of concentrate and pre-dilution water with water from the main water supply. The output of the HYDROMINDER® dispensing system flows into the stock solution tank which is already connected to a pump which pumps the fluid to the spray arch where it is again mixed with water from the main water supply before it is applied to vehicles. Thus, the only equipment provided by the account representative is a double-tip metering assembly, the pre-dilution reservoir and the concentrate reservoir.

Thus, an improved system for retrofitting existing automated vehicles washing systems is provided that enables an existing system to convert from conventional chemicals to highly concentrated chemicals. In addition, an improved method of retrofitting existing automated vehicle washing systems is provided.

It is therefore an object of the present invention to provide an improved system for pre-diluting highly concentrated chemicals for use in automated vehicle washing systems.

It is another object of the present invention to provide an improved retrofit kit for enabling existing automated vehicle washing systems to convert from conventional chemicals to highly concentrated chemicals.

Yet another object of the present invention is to provide an improved method of retrofitting or converting existing automated vehicle washing systems from using conventional chemicals to highly concentrated chemicals.

Other features and advantages of the invention will appear from the following description in which two embodiments have been set forth in detail and in conjunction with the accompanying drawings.

BRIEF DESCRIPTION OF THE DRAWINGS

This invention is illustrated more or less diagrammatically in the accompanying drawings, wherein.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

Like reference numerals will be used to refer to like or similar parts from Figure to Figure in the following description of the drawings.

Figure 1:
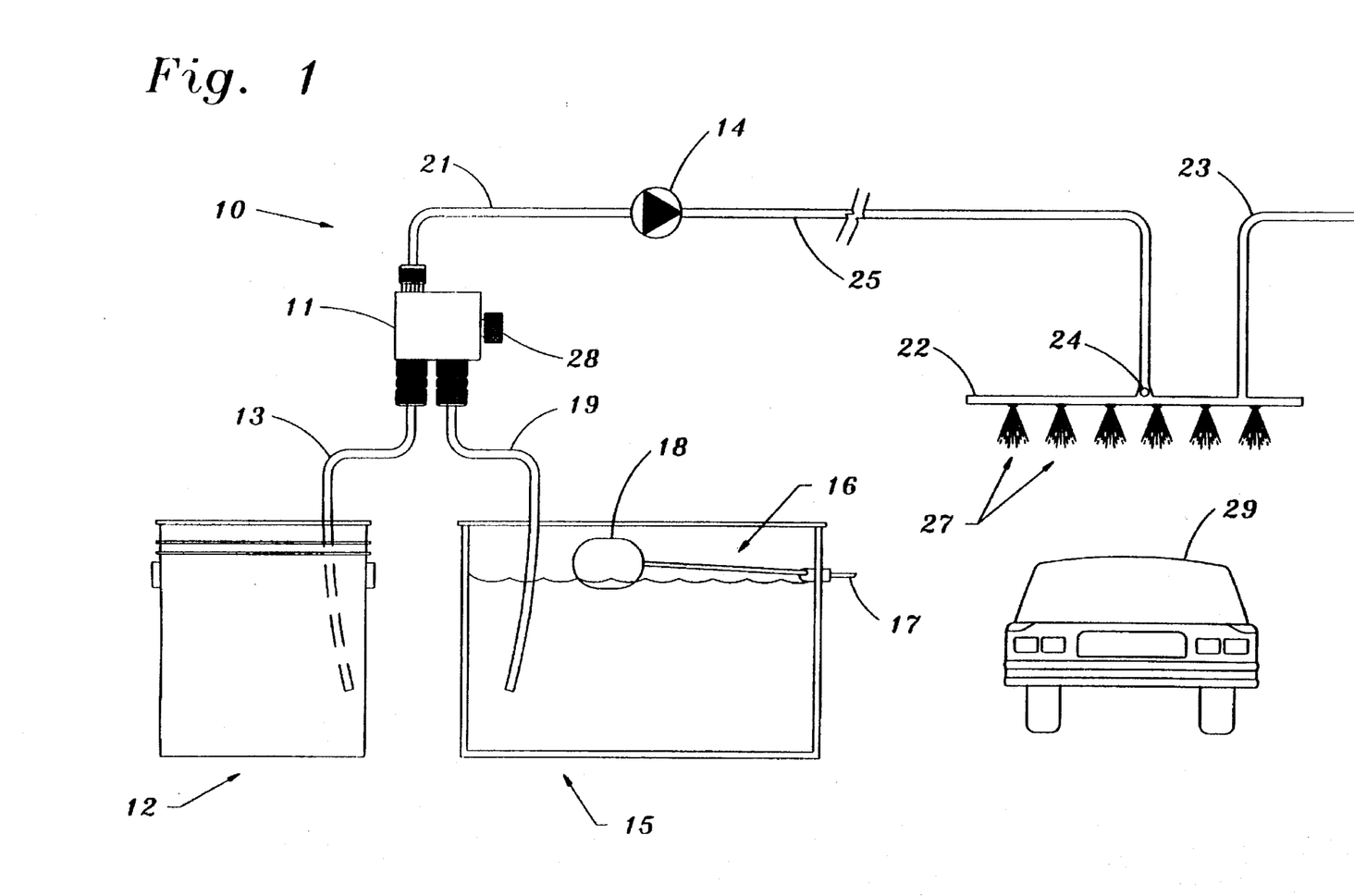
FIG. 1 is a schematic view of an automated vehicle washing system, particularly illustrating a means for diluting highly concentrated chemicals twice prior to application of the diluted chemicals to a vehicle.

FIG. 1 is an illustration of a system 10 that employs a pre-dilution block 11. Highly concentrated chemical, or concentrate, is provided in the concentrate reservoir 12. The concentrate is drawn upward through the conduit 13 under the pressure drop created by the feed pump 14.

The concentrate is diluted in the pre-dilution block 11 with water from the pre-dilution reservoir 15. The pre-dilution reservoir 15 includes a float valve apparatus 16 that will enable fresh water to enter the reservoir 15 through the supply line 17 when the water level in the reservoir 15 drops or when the float 18 drops below a predetermined level. The refill mechanism of the reservoir 15 works in a manner similar to that of a water tank for a toilet.

Pre-dilution water proceeds up through the conduit 19 into the pre-dilution block 11 where it is mixed with water before it passes out of the block 11 through the conduit 21. Again, pre-dilution water proceeds up through the conduit 19 due to the pressure drop created by the feed pump 14.

The mixture of concentrate and pre-dilution water in the conduit 21 is pumped forward by the feed pump 14 to the spray arch 22 where it is combined with water from the main water supply that is connected to the conduit 23. Water from the main water supply may be pumped into the spray arch 22 if the water pressure supplied by the municipality is not sufficiently high. Thus, a mixture of concentrate and pre-dilution water in the conduit 25 is pumped through the injection or check valve 24 and into the spray arch 22 where it is mixed again with water from the main water supply which is being pumped from the conduit 23 into the spray arch 22. The mixture of concentrate, pre-dilution water and water from the main water supply is forced through the nozzles 27 and onto the vehicle 29.

Thus, the concentrate provided in the reservoir 12 is diluted not once, but twice before it is applied to a vehicle 29. First, the concentrate is diluted with pre-dilution water from the reservoir 15 in the pre-dilution block 11. Then the mixture of concentrate and pre-dilution water is pumped into spray arch 22 by the feed pump 14 where it is combined with water from the main water supply from the conduit 23. The now properly diluted concentrate mixture is then pumped out of the nozzles 27 and applied to the vehicle 29.

Depending on the concentration or strength of the concentrate provided in the reservoir 12, the dilution ratios provided by the system 10 shown in FIG. 1 can be as high as 2,500 parts of water per 1 part of concentrate. Of course, the ultimate dilution ratio (parts of water per 1 part of concentrate) will be determined by a number of variables including the rate at which fresh water from the main water supply is provided to the spray arch 22, the rate at which the first pump 14 is operating, the rate at which pre-dilution water is provided to the pre-dilution block as well as others. The rate at which pre-dilution water is supplied to the pre-dilution block 11 may be controlled by adjusting the knurled knob 28 which controls a stem valve disposed within the dilution block 11. Essentially, rotation of the knob 28 can fully open the flow of pre-dilution water upward through the conduit 19 or completely shut off the flow of pre-dilution water through the conduit 19. Controlling the flow rate of the pre-dilution water also affects the flow rate of the concentrate through the block 11.

Depending upon the concentrate used, a stem valve to control the flow rate of concentrate through the conduit 13 may also be desirable and, in fact, it may be desirable to provide a stem valve for the concentrate proceeding upward through the conduit 13 and not require any stem valve to separately control the flow of pre-dilution water through the conduit 19. Simply put, a person skilled in the art will understand the desired dilution ratio (parts of water per 1 part of concentrate) required and will be able to make the appropriate adjustments to the system to achieve the desired dilution ratio.

Figure 3:
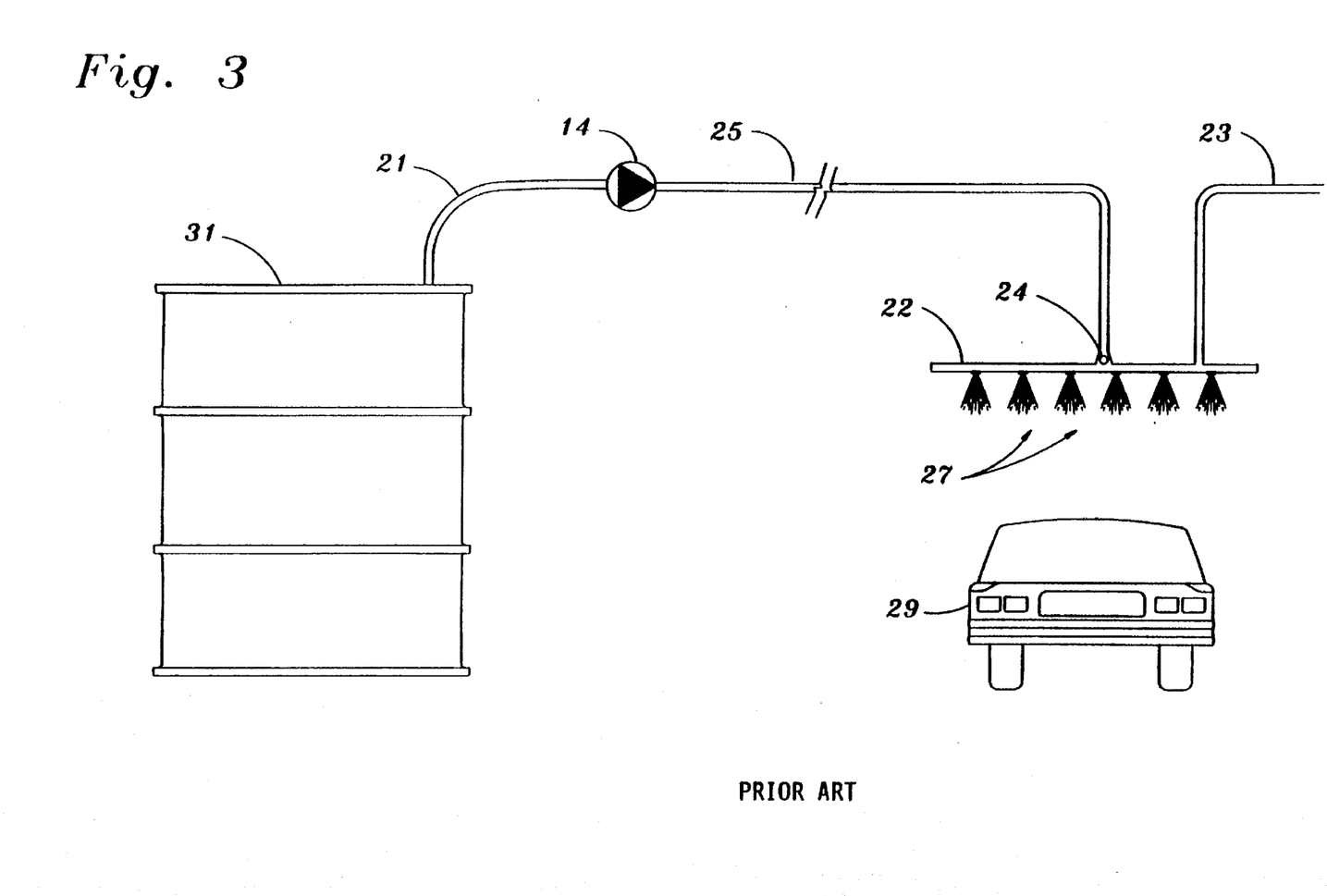
FIG. 3 is a schematic illustration of an automated vehicle washing system found in the prior art, particularly illustrating the use of conventional chemicals provided in a large drum.

Comparing FIGS. 1 and 3, one can seen how easy it is to install the system shown in FIG. 1. First, the feed pump 14 is normally already in place because such a pump is required to draw conventional chemical out of a 55-gallon drum 31. The pump 14 pumps the chemical through the conduit 25 to the injection valve 24. The valve 24 injects the chemical into the spray arch 22 where it is mixed with water supplied through the conduit 23. The conventional chemical supplied in the drum 31 needs to be diluted only once.

Referring to FIGS. 1 and 3 together, it is evident that the only modifications that need to be made to implement the system 10 shown in FIG. 1 are disposed upstream of the feed pump 14. Thus, the 55-gallon drum 31 shown in FIG. 3 is replaced by the dilution block 11, concentrate reservoir 12 and pre-dilution reservoir 15 shown in FIG. 1. The retrofit is fast, easy and inexpensive, all of which will be greatly appreciated by car wash operators.

Figure 2:
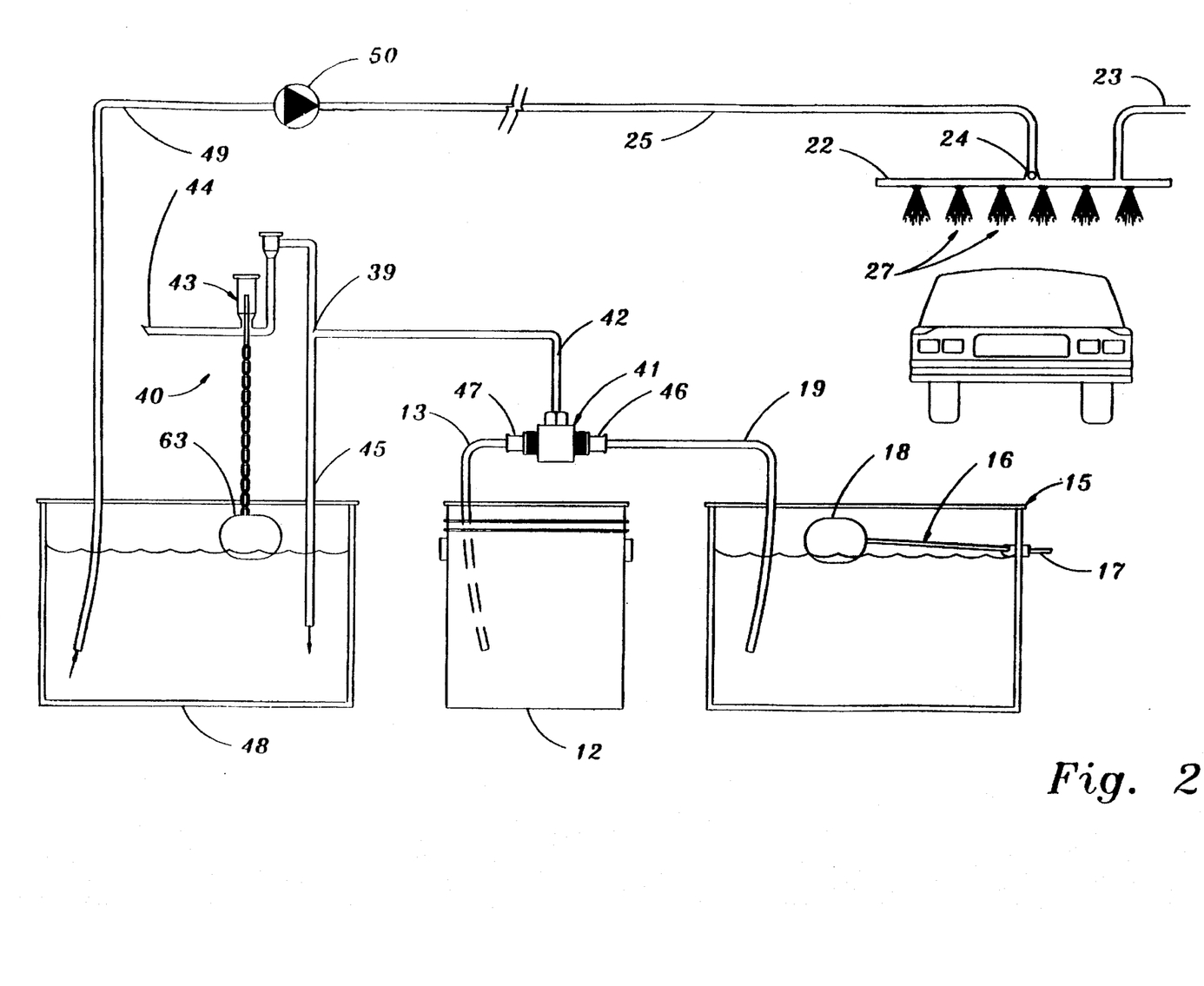
FIG. 2 is a schematic view of an alternative automated system for washing vehicles, particularly illustrating a means for diluting highly concentrated chemicals three times prior to application of the diluted chemicals to the vehicles.

Turning now to FIG. 2, an alternative system 40 is illustrated. The same concentrate reservoir 12 and pre-dilution water reservoir 15 are provided. However, the dilution block 11 (see FIG. 1) has been replaced by a combination of the double-tip metering assembly 41 where the concentrate from the conduit 13 is mixed with the pre-dilution water from the conduit 19 to produce a mixture which is passed through the output conduit 42. The output conduit 42 is connected to a proportioning and dispensing system shown generally at 43. The system 43 is often sold under the HYDROMINDER™ trademark. The mixture of concentrate and pre-dilution water from the conduit 42 is mixed with water from the main water supply which is provided through the conduit 44. The flow of water from the conduit 44 through the system 43 creates a venturi effect at the connection 39 which draws pre-dilution water through the conduit 19 and through the metering tip 46. The same venturi effect at the connection 39 draws concentrate through the conduit 13 and through the metering tip 47. Thus, the output conduit 45 carries a mixture of concentrate, pre-dilution water and water from the main water supply and is deposited into the holding tank or stock solution tank 48. When the stock solution tank 48 is full, the float 63 raises upward and closes the valve 43 to shut off the flow of water through the conduit 44. Of course, the venturi effect at the connection 39 is also stopped thereby shutting off the flow of concentrate and pre-dilution water as well.

The mixture of concentrate, pre-dilution water and water is then pumped forward from the tank 48 through the conduit 49 by the pump 50 to the spray arch 22. The conduit line 25 is connected to an injection or check valve shown at 24. The mixture of concentrate, pre-dilution water and water is diluted again in the spray arch with water supplied through the conduit 23. The dilution ratio (parts of water per part of concentrate) will be principally controlled by the size of the metering tips 46, 47 which control the flow of concentrate through the conduit 13 and pre-dilution water through the conduit 19 respectively. Specifically, by varying the size of the tips 46, 47, one can control the dilution ratio.

Thus, the system 40 shown in FIG. 2 dilutes the concentrate three times: (1) at the double-tip assembly 41 where concentrate and pre-dilution water are mixed; (2) at the connection 39 where the mixture of concentrate and pre-dilution water is further diluted with water flowing through the valve 43; and (3) in the spray arch 22 where the solution from the tank 48 is again diluted with water from the conduit 23.

Figure 4:
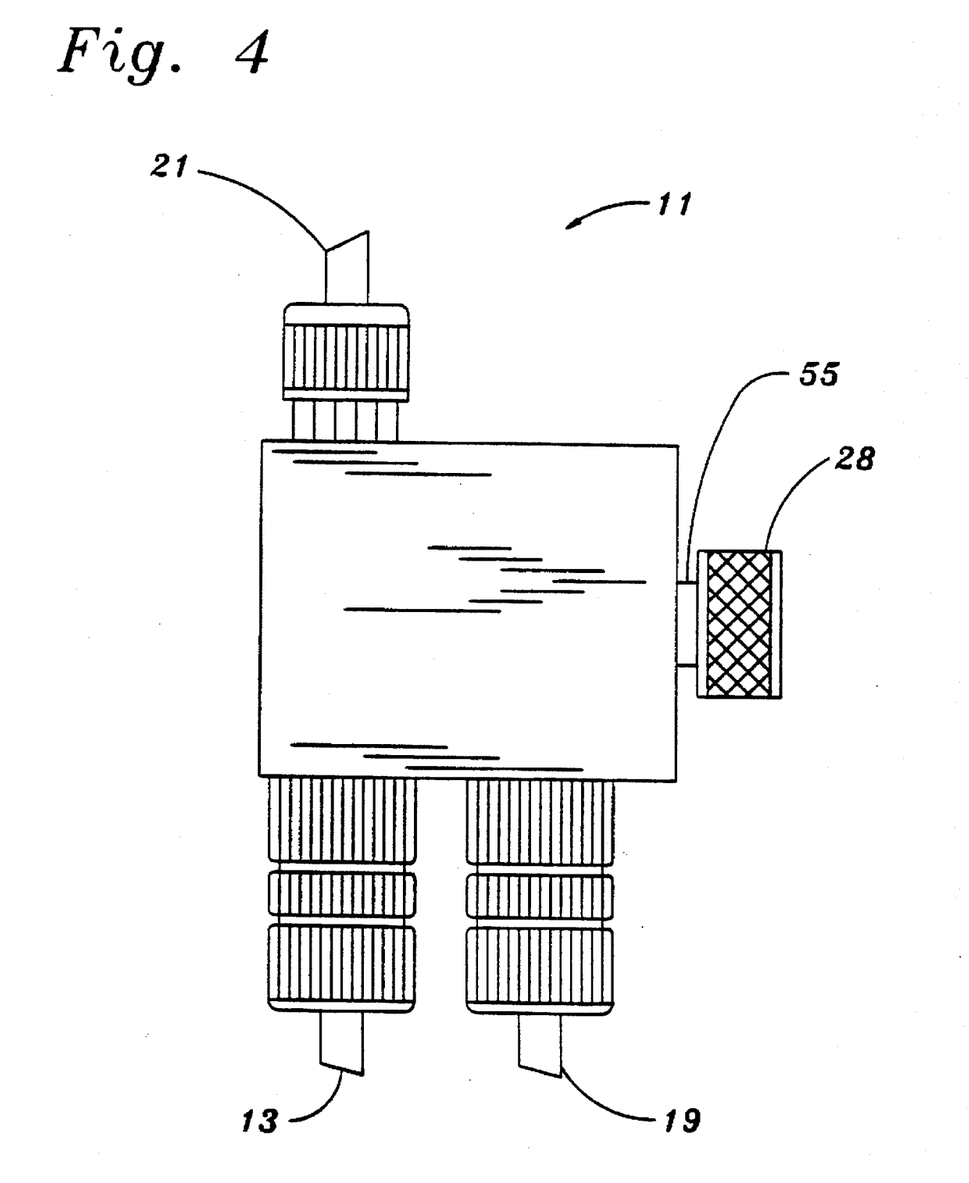
FIG. 4 is a side plan view of the pre-dilution block first shown in FIG. 1 as made in accordance with the present invention.
Figure 5:
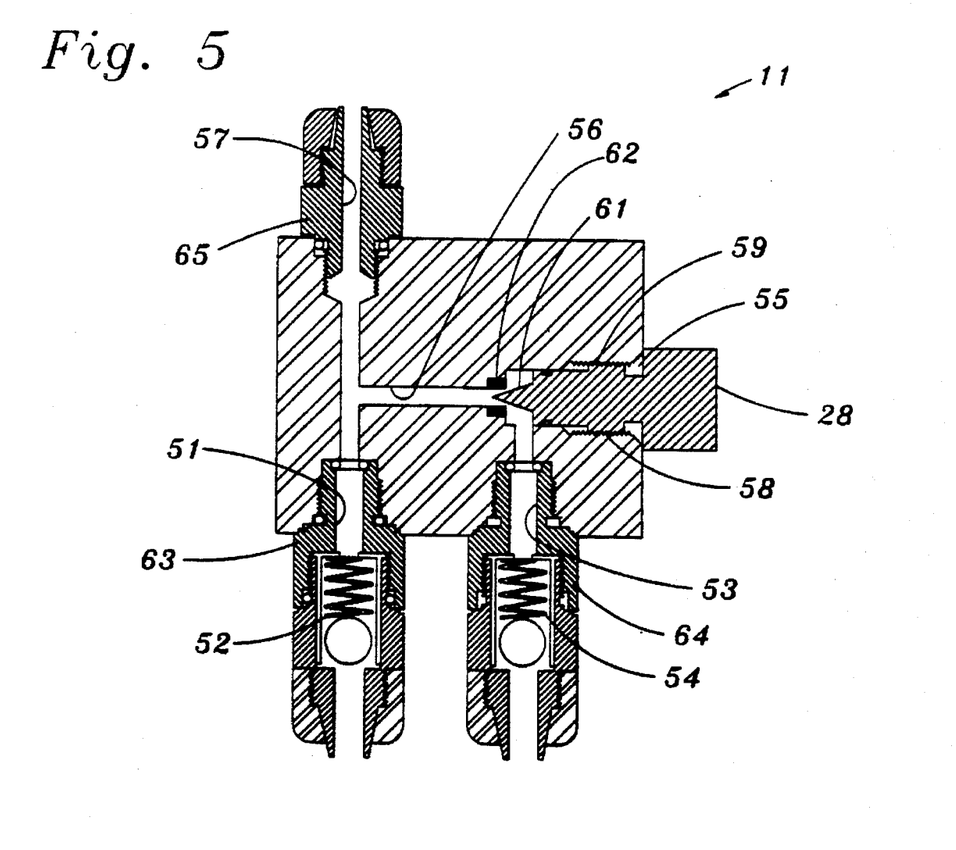
FIG. 5 is a sectional view of the pre-dilution block shown in FIG. 4.

Turning to FIGS. 4 and 5, the pre-dilution block shown at 11 in FIG. 1 is illustrated in greater detail. Concentrate enters the block 11 through the concentrate input passage 51. Before concentrate enters through the passage 51, it passes through the check valve 52 which prevents any reverse flow of concentrate/water mixture downward through the passageway 51 toward the concentrate reservoir 12 (see FIGS. 1 and 2). Pre-dilution water enters the block 11 through the pre-dilution input passage 53. Another check valve 54 is provided to prevent reverse flow of water or concentrate/water mixture downward toward the pre-dilution reservoir 15. In the block 11 illustrated in FIG. 5, a stem valve 55 is provided to control the flow of pre-dilution water through the input passage 53, the intermediate passage 56 and therefore out through the common output passage 57. The stem valve 55 includes threads 58 which engage the threaded opening 59 of the block 11. To close the stem valve 55 and prevent flow of pre-dilution water through the input passage 53, the operator twists the knurled knob 28 so as to move the stem valve 55 to the left as shown in FIG. 5 so that the lower end 61 will engage the seal 62. As noted above, the stem valve 55 may also be used to control the flow of concentrate through the conduit 13. To achieve this end, the conduit 13 would be attached to the dilution block 11 so that concentrate would be flowing through the input passage 53 and the conduit 19 would be attached to the dilution block 11 so that the pre-dilution water would enter the block 11 through the input passage 51. Thus, a threaded stem valve 55 may be provided to directly control either the pre-dilution water flow or the concentrate flow.

Figure 6:
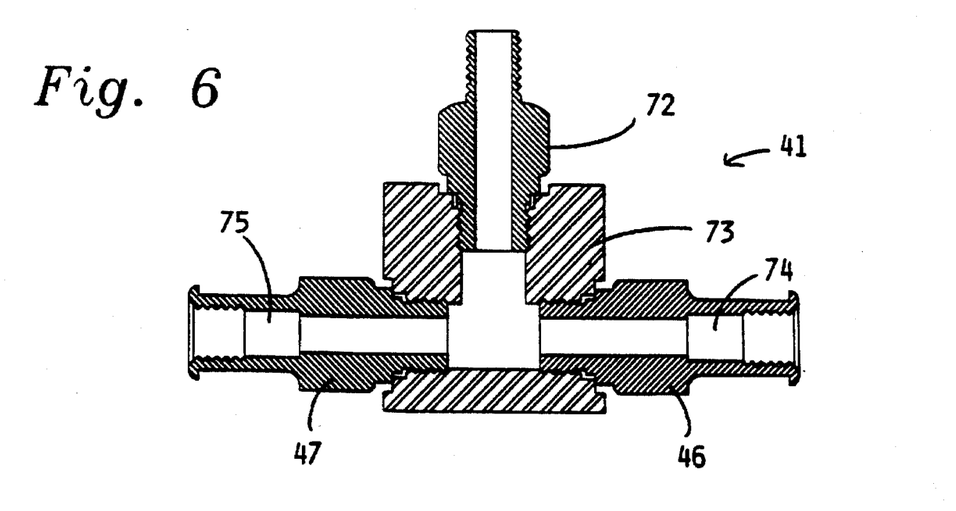
FIG. 6 is a sectional view of a double-tip metering assembly first shown in FIG. 2 as made in accordance with the present invention.

FIG. 6 is a detailed illustration of the double tip assembly 41. The fitting 72 is connected to the conduit 42 that leads into the HYDROMINDER™ valve 43 at the inner section 39. The fitting 72 is threadably connected to the block 73. The metering tips 46, 47 are also threadably connected to the block 73. Each metering tip 46, 47 includes its respective insert 74, 75 which include a pre-determined diameter. If it is determined that less concentrate should flow through the conduit 13 to the conduit 42, then the insert 75 will be changed to an insert of smaller diameter. In contrast, if more concentrate is desired, the insert 75 will be changed to an insert with a larger diameter. Of course, the insert 74 which controls the flow of pre-dilution water from the conduit 19 to the conduit 42 can also be changed. In the preferred method of operating the system, the inserts 74, 75 are color-coded which will make it easier for the operator of the system to identify the appropriate insert to be used.

Of course, different concentrations of chemicals will require different controls. It is foreseeable that a stem valve such as the one shown at 55 may need to be employed to control the flow of concentrate through the concentrate input passage 51. Further, the input passages could simply be switched so that the conduit 13 (see FIG. 1) leads into the input passage 53 and the conduit 19 (see FIG. 1) leads into the passageway 51. Finally, it will also be noted that the stem valve 55 also controls the flow of concentrate through the output passage 57 because high flow rate of pre-dilution water through the passage 56 will limit the amount of concentrate able to pass through the output passage 57. Conversely, a low flow rate of pre-dilution water through the passage 56 will result in a higher flow rate of concentrate to proceed through the output passage 57.

The method of installing the system 10 shown in FIG. 1 has been discussed above. The conduit 21 which leads into the feed pump 14 is removed from the 55-gallon drum of conventional chemicals (see FIG. 3) and is attached to the output fitting 65 of the pre-dilution block 11. A pre-dilution reservoir 15 is provided along with concentrate and a concentrate reservoir 12. The conduits 13 and 19 are then connected to the pre-dilution block 11 at fitting 63, 64 respectively. The hook-up of the conduit 25 to the spray arch 22 is already in place.

The method of installing the system 40 shown in FIG. 2 is also straightforward. The proportioning and dispensing valve 43 and the stock solution tank 48 are already in place. The 55-gallon drum of chemical is replaced by the concentrate reservoir 12 and pre-dilution reservoir 15. A double-tip assembly 41 is connected to the conduit 42 of the valve 43. The double-tip assembly 41 is then connected to the concentrate reservoir 12 via the conduit 13 and the pre-dilution reservoir 15 via the conduit 19 and the system is ready to be calibrated.

Thus, two improved methods of retrofitting existing car wash systems to accommodate hyper or highly concentrated detergents is provided. All of the equipment needed to complete the retrofit is inexpensive. The systems shown in FIGS. 1 and 2 will make it easy for the manufacturers of highly concentrated chemicals to convince car wash operators to switch from the conventional chemicals provided in a 55-gallon drum to the highly concentrated chemicals provided in a 5 gallon bag-in-a-box container.

Although only two embodiments of the present invention have been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

We claim:

1. A system for diluting concentrate with water twice prior to the application of said concentrate to vehicles comprising:

a concentrate reservoir containing concentrate;

a pre-dilution water reservoir containing water to be pre-mixed with the concentrate;

a pre-dilution block for mixing water from the pre-dilution water reservoir with the concentrate;

the concentrate reservoir being in fluid communication with the pre-dilution block, the pre-dilution water reservoir being in fluid communication with the pre-dilution block;

the pre dilution block including a concentrate input passage and a pre-dilution water input passage, the concentrate input passage and the pre-dilution water input passage being connected to a common output passage through which a mixture of concentrate and pre-dilution water passes, the pre-dilution block including a single means for regulating a flow of pre-dilution water through the pre-dilution water input passage, the single means for regulating a flow of pre-dilution water through the pre-dilution water input passage is a stem valve including threaded stem valve that is threadably connected to the pre-dilution block, a lower end of the threaded stem valve extending into the pre-dilution water input passage, the pre-dilution water input passage further including a seal that can engage the lower end of the threaded stem valve to shut off the flow of pre-dilution water through the pre-dilution water input passage;

the output passage of the pre-dilution block being in fluid communication with a feed pump;

concentrate and pre-dilution water being drawn by the feed pump through the concentrate input passage and through the pre-dilution water input passage respectively before concentrate and pre-dilution water are mixed in the common output passage of the pre-dilution block before the mixture of concentrate and pre-dilution water is pumped through the feed pump to a first input passage of a spray arch;

the spray arch including a second input passage in fluid communication with a main water supply, the mixture of concentrate and pre-dilution water from the feed pump being mixed with water from the main water supply in the spray arch before passing out of the spray arch through a plurality of spray nozzles.

2. The system of claim 1, wherein the pre-dilution water reservoir is connected to the main water supply and further includes a float valve that opens communication between the pre-dilution water reservoir and the main water supply when the water in the pre-dilution water reservoir drops below a pre-determined level.

3. The system of claim 2, wherein the pre-dilution water input passage includes a check valve to prevent flow of water or concentrate or mixture from the pre-dilution block toward the pre-dilution water reservoir.

4. The system of claim 3, wherein the concentrate input passage includes a check valve to prevent flow of concentrate or water or mixture from the pre-dilution block toward the concentrate reservoir.

5. A system for washing vehicles comprising:

a concentrate reservoir containing concentrate;

a pre-dilution water reservoir containing water to be pre-mixed with the concentrate;

a dual tip assembly for mixing water from the pre-dilution water reservoir with the concentrate;

the dual tip assembly including a concentrate input passage in communication with the concentrate reservoir and a pre-dilution water input passage in communication with the pre-dilution water reservoir, the concentrate input passage and the pre-dilution water input passage being connected to a common output passage through which a mixture of concentrate and pre-dilution water passes;

the output passage of the dual tip assembly being in fluid communication with a three-way valve;

the three-way valve including a main water supply input passage and a pre-mix input passage which is connected to the common output passage of the dual tip assembly, the main water supply input passage and the pre-mix input passage of the three-way valve being connected to a stock solution output passage through which a mixture of water from the main water supply and a pre-mixture of concentrate and pre-dilution water passes;

the stock solution output passage of the three-way valve being in communication with a stock solution tank, the stock solution tank being connected to a pump;

concentrate, pre-dilution water and water from the main water supply being pumped from the stock solution tank to a spray arch, the spray arch also being connected to the main water supply;

concentrate, pre-dilution water and water from the main water supply being mixed with additional water from the main water supply in the spray arch before passing out of the spray arch through spray nozzles disposed in the spray arch.

6. The system of claim 5, wherein the concentrate reservoir comprises a reusable 15 gallon container.

7. The system of claim 6, wherein the pre-dilution water reservoir is connected to the main water supply and further includes a float valve that opens communication between the pre-dilution Water reservoir and the main water supply when the water in the pre-dilution water reservoir drops below a pre-determined level.

8. The system of claim 7, wherein the pre-dilution water input passage of dual tip assembly includes a metering tip to limit flow of pre-dilution water through the pre-dilution water input passage towards the common output passage of the dual tip assembly.

9. The system of claim 8, wherein the concentrate input passage of the dual tip assembly includes a metering tip to limit flow of concentrate through the concentrate input passage towards the common output passage of the dual tip assembly.

10. A method of retrofitting existing vehicle washing systems to accommodate concentrated vehicle cleaning and waxing chemicals, the method comprising the following steps:

providing a concentrate reservoir containing concentrate;

providing a pre-dilution water reservoir containing water to be pre-mixed with the concentrate;

providing a pre-dilution block for mixing water from the pre-dilution water reservoir with the concentrate, the pre-dilution block including a concentrate input passage and a pre-dilution water input passage, the concentrate input passage and the pre-dilution water input passage being connected to a common output passage through which a mixture of concentrate and pre-dilution water passes, the pre-dilution block including a single means for regulating a flow of pre-dilution water through the pre-dilution water input passage, the single means for regulating a flow of pre-dilution water through the pre-dilution water input passage is a stem valve including threaded stem valve that is threadably connected to the pre-dilution block, a lower end of the threaded stem valve extending into the pre-dilution water input passage, the pre-dilution water input passage further including a seal that can engage the lower end of the threaded stem valve to shut off the flow of pre-dilution water through the pre-dilution water input passage;

connecting the concentrate reservoir to the concentrate input passage of the pre-dilution block;

connecting the pre-dilution water reservoir to the pre-dilution water input passage of the pre-dilution block;

connecting the output passage of the pre-dilution block to a feed pump;

whereby an output of the feed pump is previously connected to a spray arch, the spray arch also being previously connected to a main water supply, the spray arch applying a mixture of concentrate, pre-dilution water and water from the main water supply onto vehicles.

11. A method of retrofitting existing vehicle washing systems to accommodate highly concentrated vehicle washing chemicals, the method comprising the following steps:

providing a concentrate reservoir containing cleaning solution concentrate;

providing a pre-dilution water reservoir containing water to be pre-mixed with the concentrate;

providing a dual tip assembly with a concentrate input passage and a pre-dilution water input passage, the concentrate input passage and the pre-dilution water input passage being connected to a common output passage through which a mixture of concentrate and pre-dilution water passes;

connecting the concentrate reservoir to the concentrate input passage of the dual tip assembly;

connecting the pre-dilution water reservoir to the pre-dilution water input passage of the dual tip assembly;

connecting the common output passage of the dual tip assembly to a pre-mix input passage of a three-way valve, the three-way valve already being in place and including a main water supply input passage, the pre-mix input passage and the main water supply input passage being connected to a stock solution output passage through which a mixture of concentrate, pre-dilution water, and water from the main water supply passes to a pre-existing stock solution tank;

whereby the stock solution tank being previously connected to a pump, the mixture of concentrate, pre-dilution water and water in the main water supply being pumped from the stock solution tank by the pump to a spray arch where the fluid from the stock solution tank is mixed with water from the main water supply before it is applied to vehicles.

12. A system for diluting concentrate with water twice prior to the application of said concentrate to vehicles comprising:

a concentrate reservoir containing concentrate;

a pre-dilution water reservoir containing water to be pre-mixed with the concentrate;

a pre-dilution block for mixing water from the pre-dilution water reservoir with the concentrate;

the concentrate reservoir being in fluid communication with the pre-dilution block, the pre-dilution water reservoir being in fluid communication with the pre-dilution block;

the pre dilution block including a concentrate input passage and a pre-dilution water input passage, the concentrate input passage and the pre-dilution water input passage being connected to a common output passage through which a mixture of concentrate and pre-dilution water passes, the pre-dilution block including means for regulating a flow of concentrate through the concentrate input passage, the means for regulating a flow of concentrate through the concentrate input passage is a stem valve including threaded stem valve that is threadably connected to the pre-dilution block, a lower end of the threaded stem valve extending into the concentration input passage, the concentration input passage further including a seal that can engage the lower end of the threaded stem valve to shut off the flow of concentrate through the concentration input passage;

the output passage of the pre-dilution block being in fluid communication with a feed pump;

concentrate and pre-dilution water being drawn by the feed pump through the concentrate input passage and through the pre-dilution water input passage respectively before concentrate and pre-dilution water are mixed in the common output passage of the pre-dilution block before the mixture of concentrate and pre-dilution water is pumped through the feed pump to a first input passage of a spray arch;

the spray arch including a second input passage in fluid communication with a main water supply, the mixture of concentrate and pre-dilution water from the feed pump being mixed with water from the main water supply in the spray arch before passing out of the spray arch through a plurality of spray nozzles.

13. The system of claim 12, wherein the pre-dilution water reservoir is connected to the main water supply and further includes a float valve that opens communication between the pre-dilution water reservoir and the main water supply when the water in the pre-dilution water reservoir drops below a pre-determined level.

14. The system of claim 13, wherein the pre-dilution water input passage includes a check valve to prevent flow of water or concentrate or mixture from the pre-dilution block toward the pre-dilution water reservoir.

15. The system of claim 14, wherein the concentrate input passage includes a check valve to prevent flow of concentrate or water or mixture from the pre-dilution block toward the concentrate reservoir.

16. A method of retrofitting existing vehicle washing systems to accommodate concentrated vehicle cleaning and waxing chemicals, the method comprising the following steps:

providing a concentrate reservoir containing concentrate;

providing a pre-dilution water reservoir containing water to be pre-mixed with the concentrate;

providing a pre-dilution block for mixing water from the pre-dilution water reservoir with the concentrate, the pre-dilution block including a concentrate input passage and a pre-dilution water input passage, the concentrate input passage and the pre-dilution water input passage being connected to a common output passage through which a mixture of concentrate and pre-dilution water passes, the pre-dilution block including a single means for regulating a flow of concentrate through the concentrate input passage, the single means for regulating a flow of concentrate through the concentrate input passage is a stem valve including threaded stem valve that is threadably connected to the pre-dilution block, a lower end of the threaded stem valve extending into the concentrate input passage, the concentration input passage further including a seal that can engage the lower end of the threaded stem valve to shut off the flow of concentrate through the concentrate input passage;

connecting the concentrate reservoir to the concentrate input passage of the pre-dilution block;

connecting the pre-dilution water reservoir to the pre-dilution water input passage of the pre-dilution block;

connecting the output passage of the pre-dilution block to a feed pump;

whereby an output of the feed pump is previously connected to a spray arch, the spray arch also being previously connected to a main water supply, the spray arch applying a mixture of concentrate, pre-dilution water and water from the main water supply onto vehicles.

* * * * *